United States Patent
Linjama et al.

(10) Patent No.: US 8,120,585 B2
(45) Date of Patent: Feb. 21, 2012

(54) METHOD, APPARATUS, AND COMPUTER PROGRAM PRODUCT PROVIDING VIBRATION CONTROL INTERFACE

(75) Inventors: Jukka Linjama, Espoo (FI); Hannu S. Ojala, Pirkkala (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 11/600,661

(22) Filed: Nov. 16, 2006

(65) Prior Publication Data

US 2008/0117175 A1 May 22, 2008

(51) Int. Cl.
*G06F 3/041* (2006.01)
*A63F 9/24* (2006.01)

(52) U.S. Cl. .......... 345/173; 463/37; 434/114; 715/702; 345/174; 345/156; 178/18.01; 178/18.05; 178/18.06

(58) Field of Classification Search ............. 345/156, 345/173; 463/36–38; 178/18.01, 18.03, 178/19.01, 18.05–18.06; 434/112–114; 715/700–702
See application file for complete search history.

(56) References Cited

U.S. PATENT DOCUMENTS

| | | | | |
|---|---|---|---|---|
| 5,959,613 | A  * | 9/1999  | Rosenberg et al. | 345/161 |
| 6,317,032 | B1 * | 11/2001 | Oishi | 340/407.1 |
| 2003/0184574 | A1 * | 10/2003 | Phillips et al. | 345/702 |
| 2005/0134562 | A1 * | 6/2005 | Grant et al. | 345/161 |
| 2006/0017691 | A1 * | 1/2006 | Cruz-Hernandez et al. | 345/156 |

OTHER PUBLICATIONS

Ivan Poupyrev et al., "Ambient Touch: Designing Tactile Interfaces for Handheld Devices", Proceedings of CHI, vol. 4, Issue 2, UIST'02, Oct. 27-30, 2002, Paris France, Copyright 2002 ACM 1-58113-488-6/02/0010.

* cited by examiner

*Primary Examiner* — Lun-Yi Lao
*Assistant Examiner* — Jarurat Suteerawongsa
(74) *Attorney, Agent, or Firm* — Harrington & Smith (57) ABSTRACT

A method includes defining a plurality of parameters for a vibration control pulse comprising a start pulse and a stop pulse, and outputting the vibration control pulse to a vibration element to provide tactile feedback.

23 Claims, 7 Drawing Sheets

METHOD, APPARATUS, AND COMPUTER PROGRAM PRODUCT PROVIDING VIBRATION CONTROL INTERFACE

BACKGROUND OF THE INVENTION

1. Field of the Invention

The teachings in accordance with the exemplary embodiments of this invention relate generally to a vibration control interface.

2. Brief Description of Prior Developments

Mechanical vibrators are employed in conventional electronic devices for a variety of purposes. Mobile phones and pagers utilize a mechanical vibrator to provide a vibrating notification of incoming calls or messages. Game controllers utilize a mechanical vibrator to provide the user with a vibratory effect in the controller, to simulate game mechanics, for example. Conventional mechanical vibrators are generally either binary, having a vibratory effect or no vibratory effect, or have very few vibration settings, as few as two or three that vary only in the strength of the vibratory effect.

It is known to provide tactile feedback to displays of mobile devices (See, for example, "Ambient Touch: Designing Tactile Interfaces for Handheld Devices", Proceedings of CHI, Volume 4, Issue 2, by Poupyrev et al.). Current vibrators are usually driven with a simple step function voltage signal allowing only monotone vibration. Such signals typically exhibit long rise and fall times that provide poor tactile feedback. In addition, even in instances where the vibration effect length matches well the effect's authored length, as when using Immersion Studio by the Immersion Corporation of San Jose, Calif., the vibration effect envelope can deviate substantially from the designed envelope. As a result, generated effects are not in sync with the graphical elements of, for example, games. In addition, due to the inherent nature of pulse width modulation control the produced effects are lacking in sharp definition.

In addition, pulse width modulated (PWM) vibrators used for haptic and tactile purposes typically require real-time response on the order of 5 milliseconds, that cannot be provided using commonly employed mobile terminal operating systems, such as Symbian OS by Symbian Ltd. Even in instances where it is possible to produce a real time response, the resulting vibration effects are typically left blurry.

SUMMARY

In an exemplary aspect of the invention, a method includes defining a plurality of parameters for a vibration control pulse comprising a start pulse and a stop pulse, and outputting the vibration control pulse to a vibration element to provide tactile feedback.

In another exemplary aspect of the invention, a method includes defining a first plurality of parameters for a first vibration control pulse, outputting the first vibration control pulse to a vibration element to provide tactile feedback, defining a second plurality of parameters for a second vibration control pulse having a polarity opposite that of the first vibration control pulse, and outputting the second vibration control pulse to the vibration element to provide tactile feedback.

In another exemplary aspect of the invention, a mobile phone includes a processor configured to execute a program comprising an application program interface configured to define a vibration control pulse, and a vibration element configured to provide tactile feedback in response to the vibration control pulse.

In another exemplary aspect of the invention, a method includes defining at least a first intensity parameter for a first vibration control pulse comprising a first start pulse and a first stop pulse, outputting the first vibration control pulse to a vibration element to provide tactile feedback, defining at least a second intensity parameter for a second vibration control pulse comprising a second start pulse and a second stop pulse, and outputting the second vibration control pulse to the vibration element to provide tactile feedback wherein the first intensity parameter is different from the second intensity parameter.

In another exemplary aspect of the invention, a program of machine-readable instructions, tangibly embodied on an information bearing medium and executable by a digital data processor, performs actions including defining a plurality of parameters for a vibration control pulse comprising a start pulse and a stop pulse, and outputting the vibration control pulse to a vibration element to provide tactile feedback.

In another exemplary aspect of the invention, an integrated circuit includes a first circuitry operable to define a plurality of parameters for a vibration control pulse comprising a start pulse and a stop pulse, and a second circuit operable to output the vibration control pulse to a vibration element to provide tactile feedback.

In another exemplary aspect of the invention, an integrated circuit includes a first circuitry operable to define a plurality of parameters for a vibration control pulse comprising a start pulse and a stop pulse, and a second circuit operable to output the vibration control pulse to a vibra module.

In another exemplary aspect of the invention, a method includes utilizing a vibration application program interface to define a plurality of parameters for a vibration control pulse comprising a start pulse and a stop pulse, and executing the application program interface to provide tactile feedback.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Exemplary and non-limiting embodiments of the invention provide an application program interface (API) and method for using the API to define and utilize a vibration control pulse 21. The interface provides a means to accurately output short vibration effects, and also control the strength of the effects so as to provide sharp tactile feedback and to enable adjusting of tactile feedback. The vibration control pulse 21 is formed of a positive voltage start pulse and a negative voltage stop pulse with variable polarity to allow for two way control of vibrational direction. By selecting the parameters that define the precise shape and duration of the vibration control pulse 21, the API can be employed to economically provide finely controllable haptic and tactile effects in user device, such as in a mobile phone or a gaming device.

Furthermore, exemplary and non-limiting embodiments of the invention disclose a robust control strategy, and parameters for implementing it, for driving vibration elements, such as rotating vibration motors, in an optimized manner. The control strategy is based on known (or assumed) inertial and electrical properties of the vibration actuator and properties of the driving electronics. Based on this data, a driving vibration control signal can be generated that results in an optimal, or near optimal, vibration output within given constraints. Specifically, short and sharp vibration effects can be outputted. In addition, the strength of the effects can be adjusted (via an intensity parameter), taking into account the specific constraints of the nature of controlling rotating motors without feedback.

Figure 1:
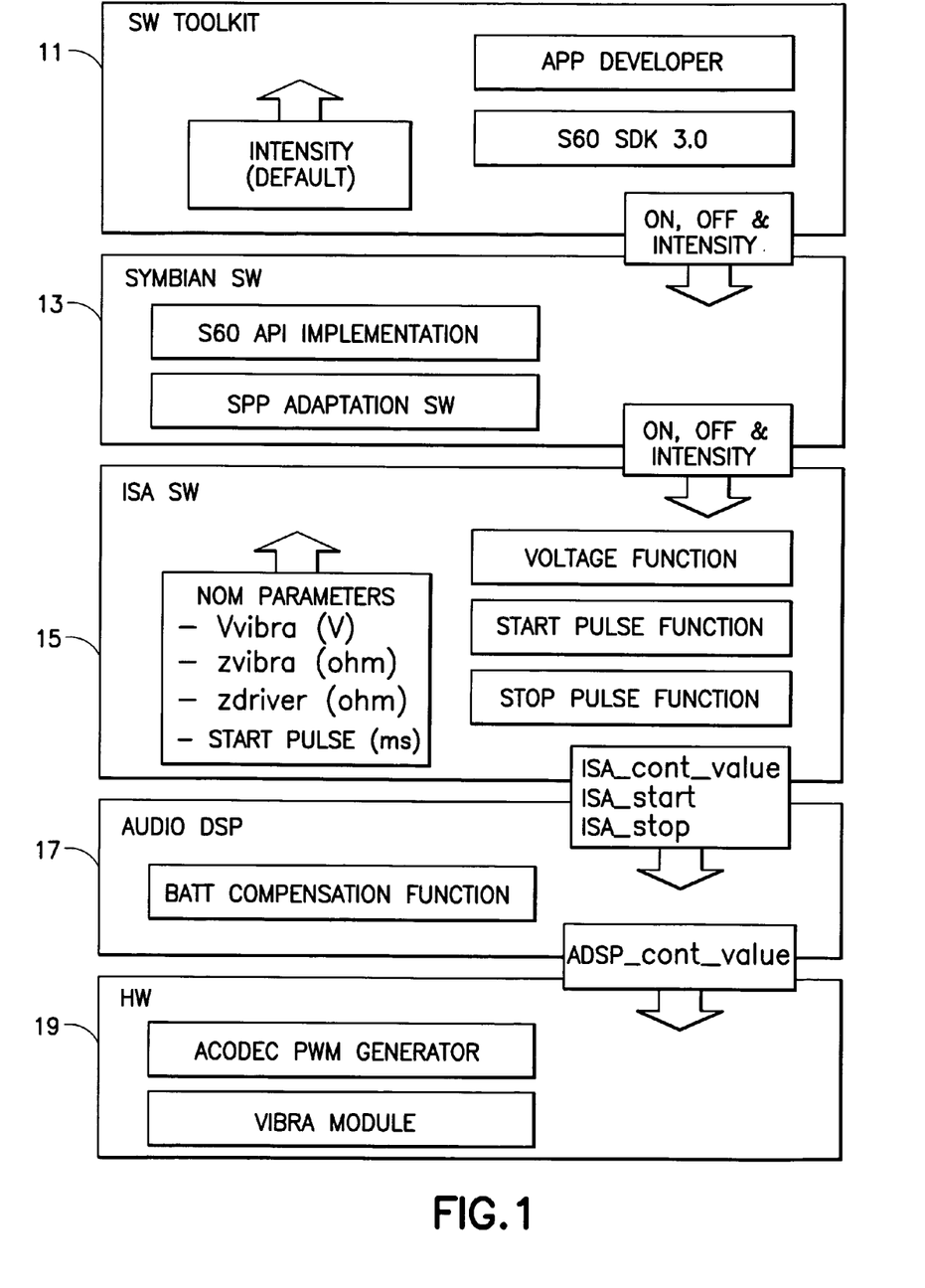
FIG. 1 is a schematic diagram of software and hardware components for practicing exemplary embodiments of the invention.

With reference to FIG. 1, there is illustrated a schematic diagram of the interaction of software and hardware elements that function together to implement an exemplary embodiment of the invention. In general, exemplary and non-limiting embodiments of the invention function to provide an application program interface (API) 49 to allow an executable program 47 to define a voltage control pulse 21 for controlling a vibration in a hardware component. While described with reference to use in a mobile phone, exemplary and non-limiting embodiments of the invention may extend to any and all mobile devices capable of executing software to control a vibrational element formed of hardware including, but not limited to, personal digital assistants (PDAs), gaming devices and the like.

As illustrated, a software toolkit 11 includes an application program interface (API) for specifying or otherwise defining a vibration control pulse 21, described more fully below with reference to FIG. 2. In an exemplary and non-limiting embodiment, the API may form part of a software development kit (SDK) including, but not limited to, S60 SDK 3.0. In practice, the API can be utilized by the software toolkit 11 to generate or otherwise create an application for execution by an operating system 13. The API includes parameters to define, at least, the start of the vibration control pulse, the stop of the vibration control pulse, and the intensity of the vibration control pulse.

Operating system 13 operates to provide an environment within which an executable program, embodying the API, can be executed. Examples of an operating system 13 for implementing exemplary and non-limiting embodiments of the invention include the Symbian mobile operating system.

The operating system 13, in particular programs executed within the operating system 13 environment, can further interact with an industry standard architecture (ISA) software (SW) 15. The ISA SW 15 operates as a layer between the operating system 13 and the hardware platform or elements on which a vibration is to be produced. While illustrated as separate elements, in practice, the functionality of the operating system 13 and the ISA SW can be combined so as to both execute implementations of the API and interact with the hardware 19. Specifically, the ISA SW 15 outputs a digital signal indicative of the vibration control pulse 21 to be implemented in hardware 19.

Audio digital signal processor (DSP) 17 receives the output from the ISA SW 15 and applies a battery compensation function to reduce variability in battery voltage. In practice, the battery voltage in mobile devices can vary considerably. As the desired vibration control pulse 21 is a function of a nominal vibration voltage, described more fully below, such battery voltage variations can result in undesirable vibration voltage variation. In an exemplary and non-limiting embodiment, the Audio DSP 17 applies linear battery compensation to reduce battery voltage variability.

The signal output from Audio DSP 17 forms the input to the hardware 19. Specifically, the signal received from the Audio DSP is a time varying vibration control pulse 21 that is employed to drive a vibration module. More particularly, as described more fully below with reference to FIG. 4, the vibration control pulse drives a vibration element 48 for providing tactile feedback or other vibratory information to the user of a mobile device 41. Examples of such vibration elements include, but are not limited to, haptic actuators, particularly those embedded in haptic displays.

Figure 2:
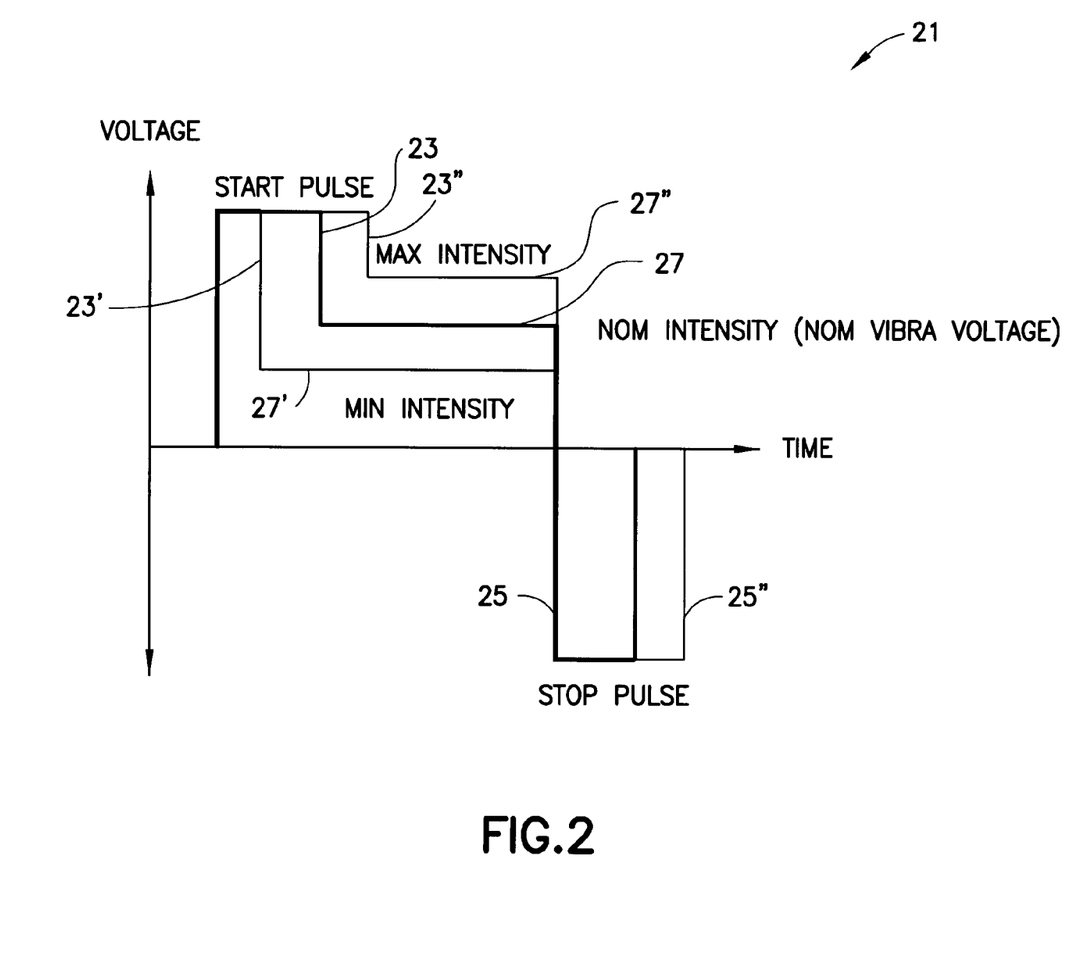
FIG. 2 is a diagram of a vibration control pulse according to an exemplary embodiment of the invention.

With reference to FIG. 2, there is illustrated a vibration control pulse 21 according to an exemplary and non-limiting embodiment of the invention. Typical vibration control pulses utilized in the art are formed of a unit step increase in voltage from a base level to a constant activation level followed, after a time interval, by a unit step decrease back to the base level. The resulting vibrational effect produced by such a signal tends to start slowly and stop quickly.

As illustrated, vibration control pulse 21 is formed of a start pulse 23 and a stop pulse 25 separated by a nominal voltage period 27. Each transition from a zero or reference voltage, to start pulse 23, to nominal voltage period 27, to stop pulse 25, back to zero voltage is a step function. The precise shape and proportions of the vibration control pulse 21 are controlled and defined by the parameters of the API 49. These parameters include an intensity parameter, a vibration nominal voltage, a vibration nominal start pulse, and can include a vibration nominal stop pulse.

Figure 6:
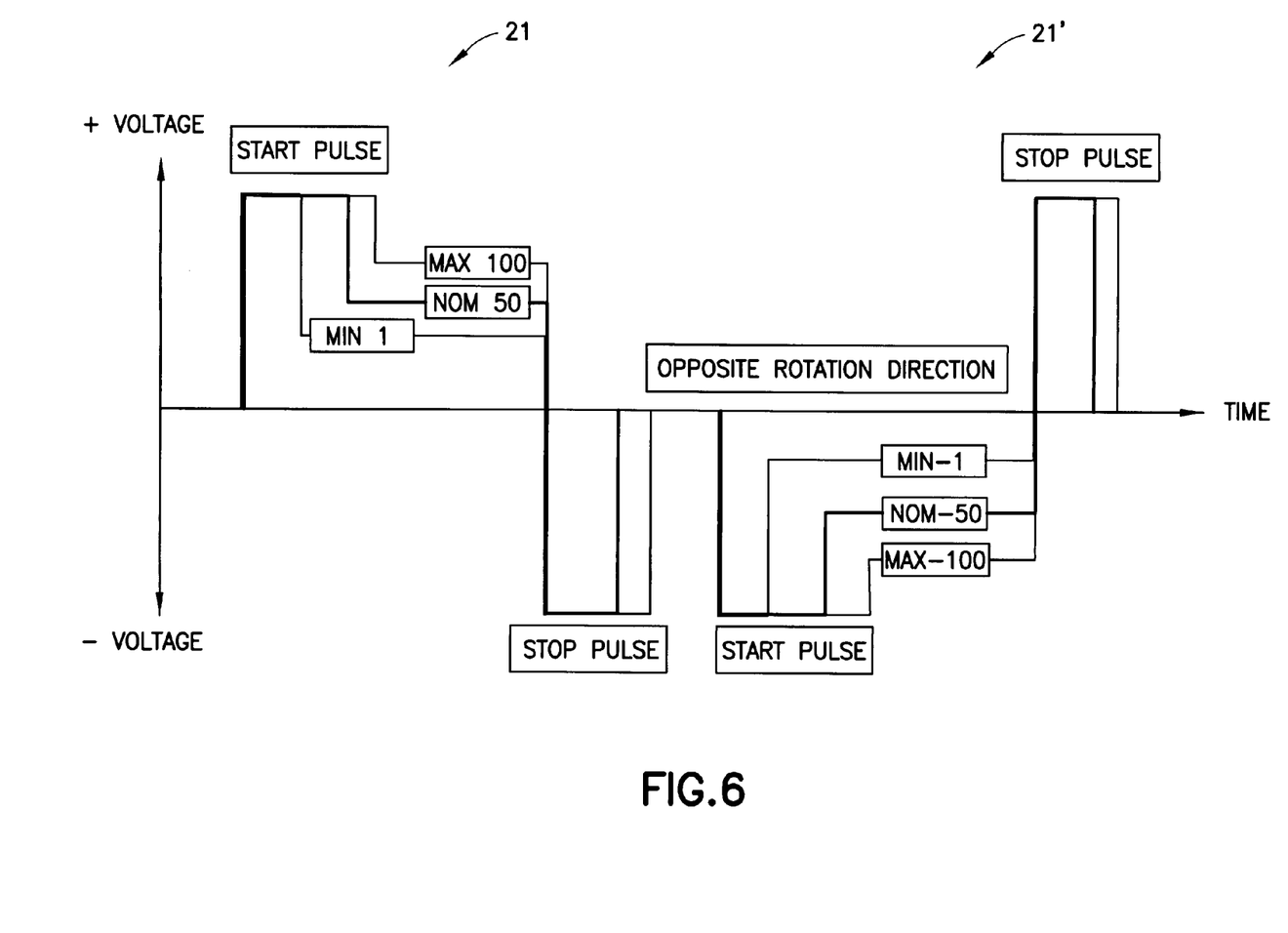
FIG. 6 is a diagram of two vibration control pulses having opposite rotation direction form each other according to an exemplary embodiment of the invention.

The intensity parameter is defined, in one exemplary and non-limiting embodiment, to range from a value of one to a value of one hundred with a value of fifty being nominal. The intensity parameter can additionally assume values between (for example) negative one and negative one hundred with negative fifty being nominal. In the instance that a negative intensity parameter is utilized, there is produced an opposite rotation, or polarity, of the vibration control pulse 21 whereby vibration control pulse 21 is reversed about the x-axis from that illustrated in FIG. 2. Specifically, with reference to FIG. 6, there is illustrated a vibration control pulse 21 and a vibration control pulse 21' having an opposite rotation direction.

Once the parameters for the API are provided, the shape of the vibration control pulse 21 can be computed. First, there is calculated an ISA control value (ISA_cont_value). Specifically, ISA_cont_value is equal to (Vvibra/(3.6* (zvibra/(zvibra+zdriver)))*32767* (Intensity/200)+a where Vvibra is the nominal voltage of a vibration motor, zvibra is the impedance of the vibration motor, zdriver is the output impedance of the driving amplifier stage, and where Intensity is equal to the intensity parameter. If the Intensity>=1, a=0.75. If the Intensity<=1, a=−0.75. And, if the Intensity=0, the vibration control pulse is a uniform zero volts. Furthermore the value "3.6" represents an exemplary and non-limiting embodiment of a default battery voltage of 3.6V. The resulting ISA_cont_value ranges, depending on the specified intensity parameter and vibration nominal voltage, from 0.75 . . . 1.25 times the vibration nominal voltage. In the instance of an opposite rotation of the vibration control pulse 21, the resulting ISA_cont_value ranges from −0.75 . . . −1.25 times the vibration nominal voltage.

As illustrated, nominal voltage period 27 corresponds to a period wherein the voltage of the vibration control signal is equal to the vibration nominal control voltage. Similarly, nominal voltage period 27' corresponds to a period wherein the voltage of the vibration control signal is equal to the vibration nominal control voltage times 0.75. As is further illustrated, nominal voltage period 27" corresponds to a period wherein the voltage of the vibration control signal is equal to the vibration nominal control voltage times 1.25.

Start pulse 23 is a pulse that extends, at a substantially uniform positive voltage for a defined period of time. In an exemplary embodiment, the uniform positive voltage is equal to the direct Vbatt minus losses of the driver. The period of time over which the start pulse 23 extends is variable and ranges from 0.5 . . . 1.5*times the vibrational nominal start pulse parameter. This start pulse 23 time period (ISA_Start) is equal to Start*((Intensity/100)+0.5) where Start is the vibrational nominal start pulse parameter. In an exemplary and non-limiting embodiment, the value of the vibrational nominal start pulse parameter is approximately equal to 30 ms. As illustrated, when the intensity parameter is equal to fifty, the result is start pulse 23. When the intensity parameter is equal to one, the result is start pulse 23' wherein the duration of start pulse is approximately one half of the value of the vibrational nominal start pulse parameter. Similarly, when the intensity parameter is equal to one hundred, the result is start pulse 23" wherein the duration of start pulse is approximately one and one half times the value of the vibrational nominal start pulse parameter. In the instance that the intensity parameter is equal to zero, the vibration control pulse remains at a uniform zero volts.

Stop pulse 25 is a pulse that extends, at a substantially uniform negative voltage for a defined period of time. In an exemplary and non-limiting embodiment the uniform negative voltage is of a substantially equal but opposite magnitude as that of the uniform voltage of start pulse 23. The period of time over which the start pulse 23 extends is variable and ranges from 0.0 . . . 1.33*times a constant value. In the exemplary embodiment illustrated, this constant value is equal to 30 ms. As noted above, this constant value can be altered by supplying a different value in the form of an optional vibration nominal stop pulse parameter. The stop pulse 25 time period (ISA_Stop) is equal to 60*(Intensity/(intensity+50)). As illustrated, when the intensity parameter is equal to fifty, the result is stop pulse 25 with a time period of 30 ms. When the intensity parameter is equal to one hundred, the result is stop pulse 25' wherein the duration of stop pulse is approximately one and one third times the value of the 30 ms constant. In the instance that the intensity parameter is equal to zero, the vibration control pulse remains at a uniform zero volts.

Figures 3, 3B:
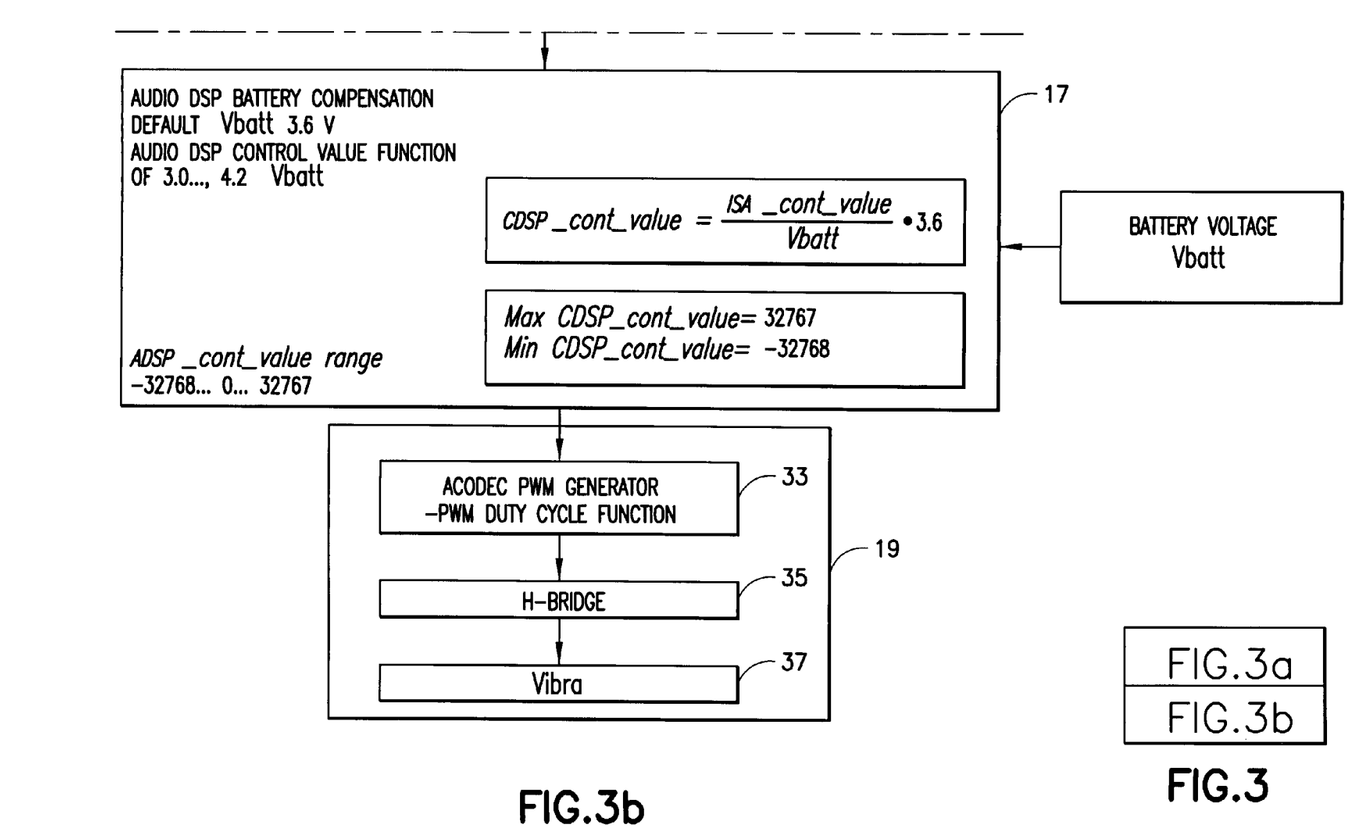
FIG. 3 is a diagram of the derivation of control parameters for the vibration control pulse according to an exemplary embodiment of the invention.
Figure 3A:
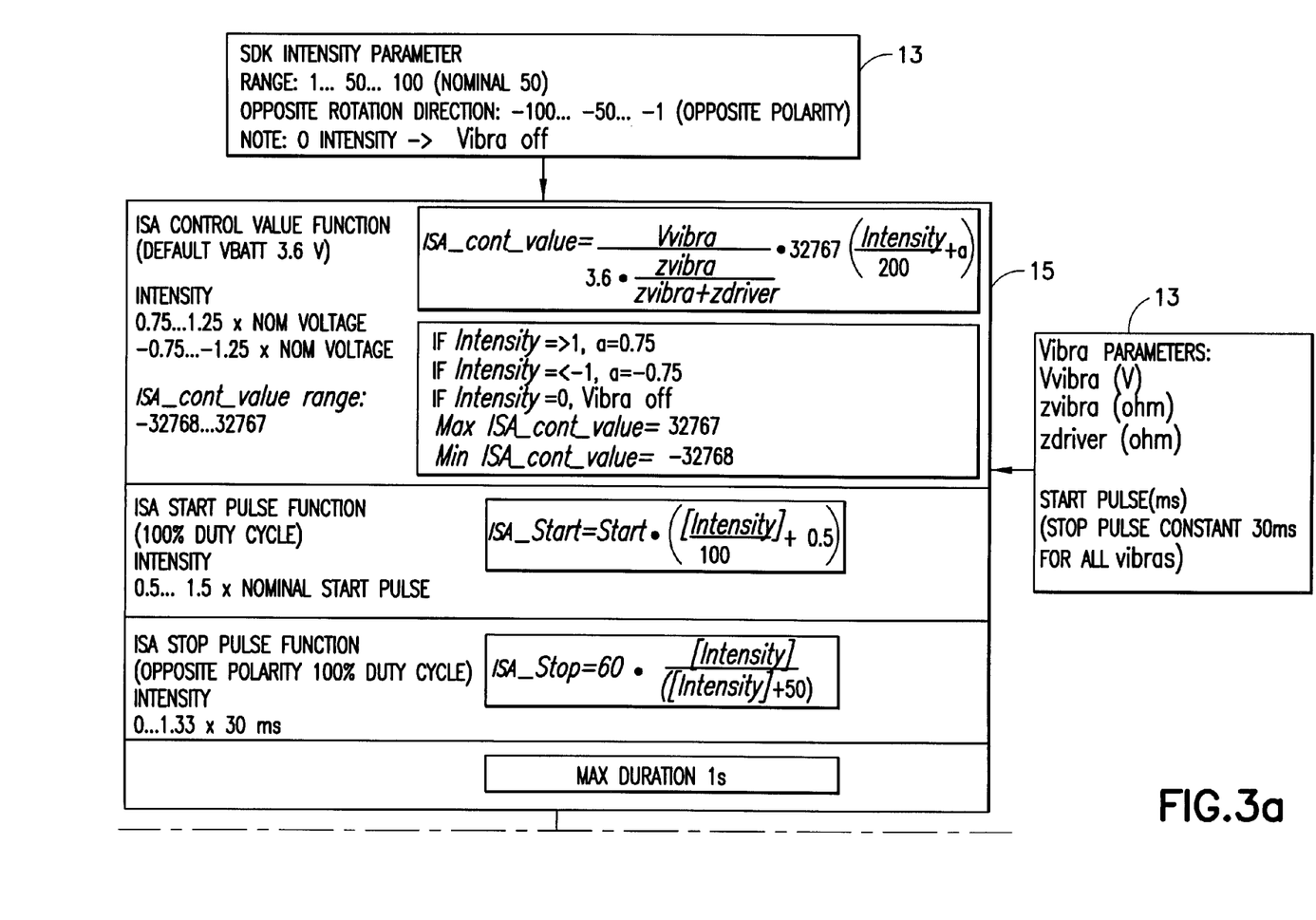

With reference to FIG. 3, there is illustrated in detail the derivation of the attributes of vibration control pulse 21. As illustrated, the intensity parameter and vibration nominal start pulse parameters form inputs as do the vibration parameters Vvibra, zvibra, and zdriver. As described above, these input parameters are output from the mobile operating system 13. From these parameters, there are derived the values for ISA_cont_value, ISA_Start, and ISA_Stop as described above.

The outputted ISA_cont_value serves as input to the Audio DSP 17 as does the Vbatt parameter derived from analog measurement of the battery voltage. Using these inputs, a CDSP-Cont_value is calculated (where "CDSP" is a cellular DSP) as equal to ((ISA_cont-value/Vbatt)*3.6). In an exemplary embodiment, Audio DSP 17 provides linear compensation of the battery voltage with a 1 mV resolution.

Lastly, the computed values ISA_cont_value, ISA_Start, ISA_Stop, and CDSP_cont_value serve as inputs to the hardware 19. Specifically, the Acodec PWM generator 33 outputs a pulse width modulated signal in the form of the vibration control pulse 21 to a vibration element 37 via an H-bridge 35.

Figure 4:
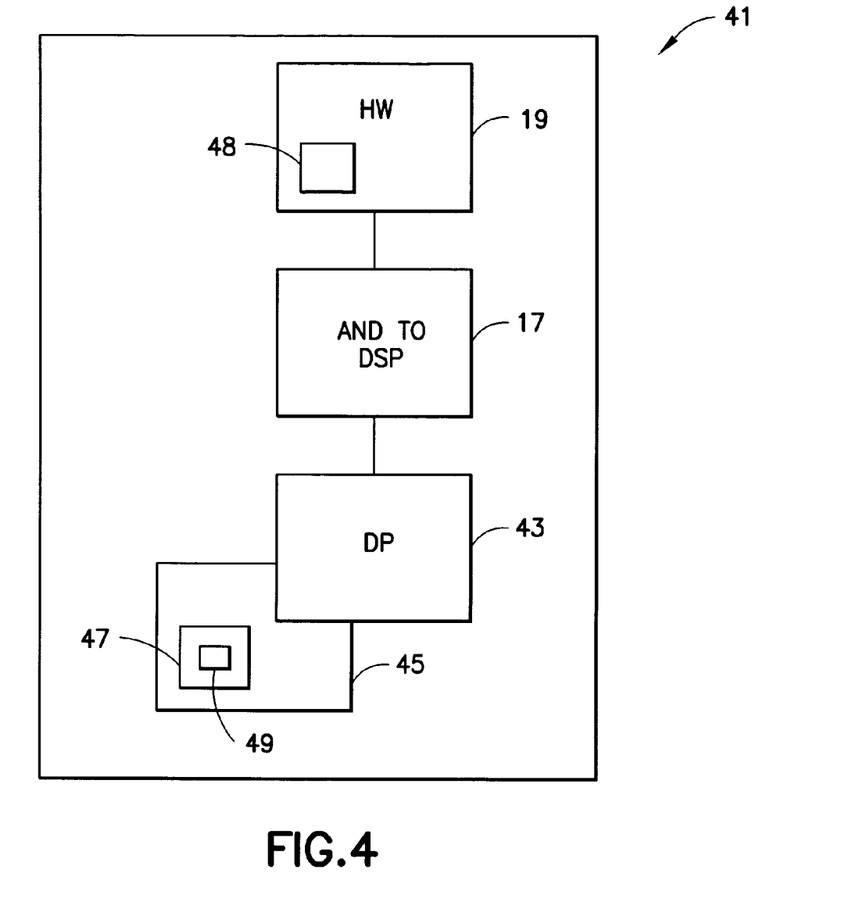
FIG. 4 is a diagram of an apparatus for practicing exemplary and non-limiting embodiments of the invention.

With reference to FIG. 4, there is illustrated a schematic diagram of a mobile device 41 for implementing exemplary embodiments of the invention. In an exemplary and non-limiting embodiment of the invention, mobile device is 41 is a mobile phone. A digital processor 43 is coupled to a memory 45. Memory 45 can be any memory medium, such as internal or external RAM or flash memory, capable of storing and retrieving digital data. At least an executable program 47 including an API 49 is stored on memory 45. When retrieved and executed by digital processor 43, the executable program 47 serves to implement API 49 via operation in a mobile operating system 13 at least partially resident on digital processor 43. As described above, the digital processor 43 outputs a signal to hardware 19 via an audio DSP 17. As illustrated, hardware 19 includes a vibration element 48, such as a haptic or tactile feedback element, that vibrates in accordance with the vibration control signal 21 output from DSP 17. In an exemplary and non-limiting embodiment, the vibration element 48 forms part of a touch screen display.

Figure 5:
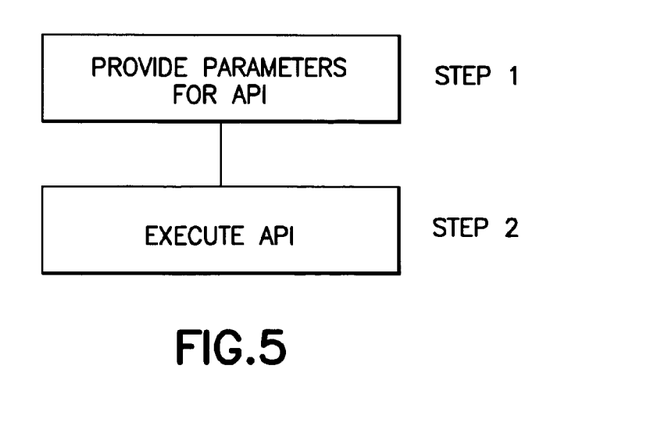
FIG. 5 is a step diagram of a method according to another exemplary embodiment of the invention.

With reference to FIG. 5, there is illustrated a method according to an exemplary embodiment of the invention. At step 1, the parameters defining the vibration control pulse 21 are provided via the API 49. As described above, the parameters allow for the varying of the intensity and duration of the start and stop pulses forming the vibration control pulse 21. At step 2, the API 49 is executed, for example by executing an executable program containing the API 49, to produce a vibration effect in a vibration element 48. As discussed above, this process can be repeated as desired and may be formed with varying polarity and intensity parameters to produce desired vibrational effects.

As is evident from the description above, exemplary embodiments of the invention provide a vibration interface, in particular an API 49, that contains a value of vibration intensity as expressed as a percent. Use of the API 49 offers a tuning configuration for vibration elements and motors that serves as the basis for a duty-cycle calculation. Specifically, start and stop pulses may be calculated based on vibration motor specific tuning parameters and user vibration parameters. Furthermore, the vibration control signal is corrected based on battery voltage. Benefits of the above described exemplary and non-limiting embodiments of the invention include the production of vibration effects with better reliability, lower field failure rate (FFR), a broader range of implementation in applications, a better user experience, and easier product integration.

Figure 7:
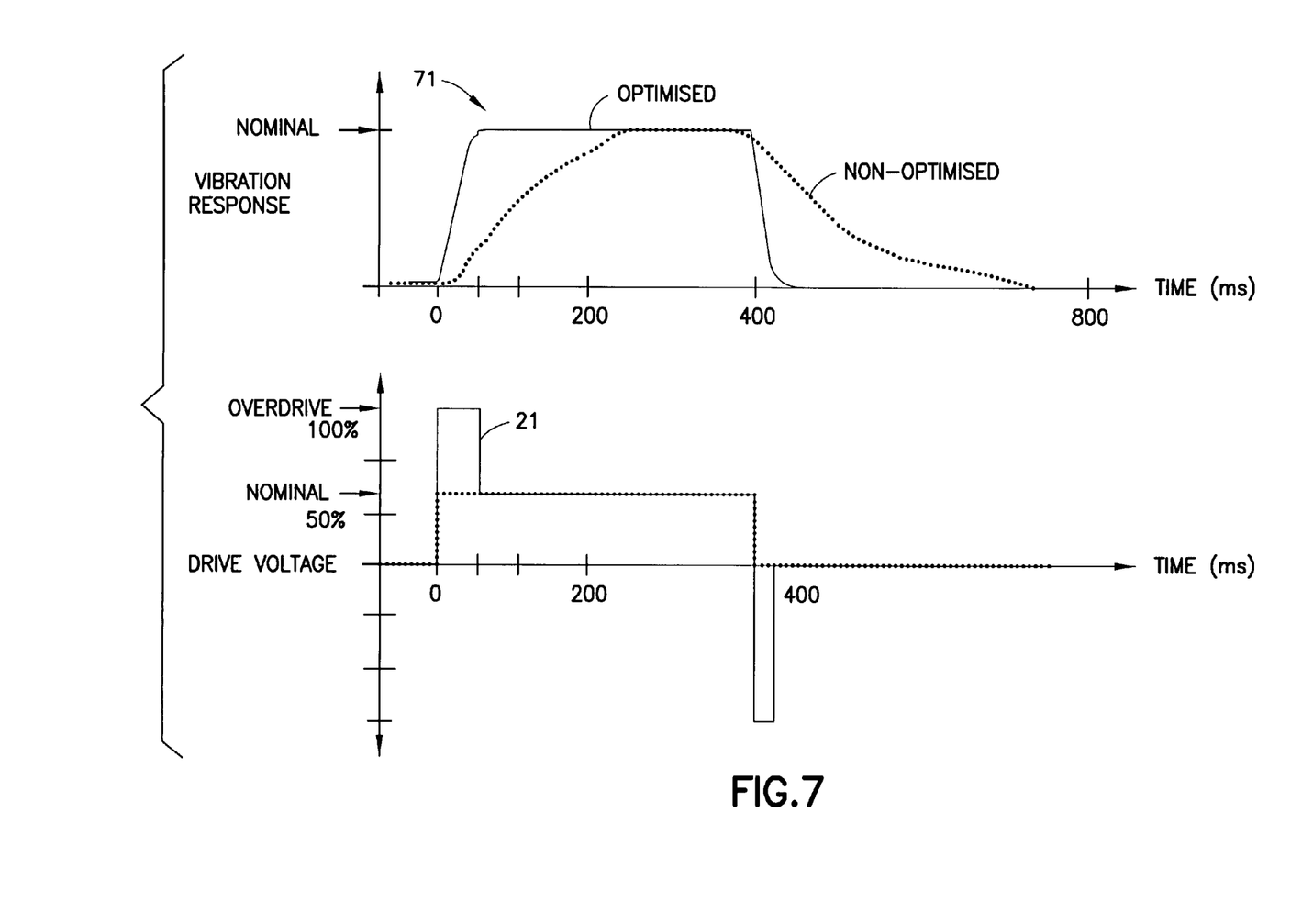
FIG. 7 is a diagram of a vibration control pulse and the resulting vibration response according to an exemplary embodiment of the invention.

With reference to FIG. 7, there is illustrated a vibration control pulse 21 and the corresponding vibration response 71. As is evident, the resulting vibration response 71 exhibits sharp transitions resulting in a desirable tactile effect.

The embodiments of this invention may be implemented by computer software executable by a data processor of the mobile device 41, such as the data processor 43, or by hardware, or by a combination of software and hardware. Further in this regard it should be noted that the various blocks of the logic flow diagram of FIG. 5 may represent program steps, or interconnected logic circuits, blocks and functions, or a combination of program steps and logic circuits, blocks and functions.

The memory 45 may be of any type suitable to the local technical environment and may be implemented using any suitable data storage technology, such as semiconductor-based memory devices, magnetic memory devices and systems, optical memory devices and systems, fixed memory and removable memory. The data processor 43 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided, by way of exemplary and non-limiting examples, a full and informative description for carrying out the invention. However, various modifications and adaptations may become apparent to those skilled in the relevant art in view of the foregoing description, when read in conjunction with the accompanying drawings and the appended claims.

Furthermore, some of the features of the preferred embodiments described above could be used without the corresponding use of other features. As such, the foregoing description should be considered as merely illustrative of the invention, and not limiting the invention.

What is claimed is:

1. A method comprising:
    defining a plurality of parameters for a vibration control pulse comprising a start pulse and a stop pulse, wherein said plurality of parameters comprises at least an intensity parameter, said intensity parameter being factor that is configured to be used to compute shape of said vibration control pulse and to control at least strength of said vibration control pulse;
    using said intensity parameter together with a vibration nominal voltage to compute voltage of said vibration control pulse between said start pulse and said stop pulse;
    using said intensity parameter to compute duration of said start pulse and said stop pulse; and
    outputting said vibration control pulse to a vibration element to provide tactile feedback.

2. The method of claim 1 wherein said vibration element forms a part of a touch screen.

3. The method of claim 1 wherein said vibration element forms a part of a battery powered mobile device.

4. The method of claim 1 wherein said start pulse comprises a positive voltage and said stop pulse comprises a negative voltage.

5. The method of claim 1 wherein said plurality of parameters further comprises at least one of a vibration nominal start pulse, and a vibration nominal stop pulse.

6. The method of claim 1 wherein said plurality of parameters are defined in an application program interface.

7. The method of claim 1 wherein said vibration element comprises a haptic actuator.

8. A device comprising;
    a processor configured to execute a program comprising an application program interface configured to define a plurality of parameters for a vibration control pulse comprising a start pulse and a stop pulse, wherein said plurality of parameters comprises at least an intensity parameter, said intensity parameter being a factor that is configured to be used to compute shape of said vibration control pulse and to control at least strength of said vibration control pulse;
    the application program interface being configured to use said intensity parameter together with a vibration nominal voltage to compute voltage of said vibration control pulse between said start pulse and said stop pulse;
    the application program interface being configured to use said intensity parameter to compute duration of said start pulse and said stop pulse; and
    a vibration element configured to provide tactile feedback in response to said vibration control pulse.

9. The device of claim 8 wherein said vibration element forms a part of a touch screen.

10. The device of claim 8 wherein said start pulse comprises a first polarity and said stop pulse comprises a second, opposite polarity.

11. The device of claim 8 wherein said application program interface further comprises a plurality of parameters comprising at least one of a vibration nominal start pulse, and a vibration nominal stop pulse.

12. The device of claim 8 wherein said vibration element comprises a haptic actuator.

13. The device of claim 8 wherein said vibration control pulse has a negative polarity.

14. A method comprising:
    defining at least a first intensity parameter for a first vibration control pulse comprising a first start pulse and a first stop pulse, said first intensity parameter being a factor that is configured to be used to compute shape of said first vibration control pulse and to control at least strength of said first vibration control pulse;
    using said first intensity parameter together with a first vibration nominal voltage to compute voltage of said first vibration control pulse between said first start pulse and said first stop pulse;
    using said first intensity parameter to compute duration of said first start pulse and said first stop pulse;
    outputting said first vibration control pulse to a vibration element to provide tactile feedback;
    defining at least a second intensity parameter for a second vibration control pulse comprising a second start pulse and a second stop pulse, said second intensity parameter being a factor that is configured to be used to compute shape of said second vibration control pulse and to control at least strength of said second vibration control pulse;

using said second intensity parameter together with a second vibration nominal voltage to compute voltage of said second vibration control pulse between said second start pulse and said second stop pulse;

using said second intensity parameter to compute duration of said second start pulse and said second stop pulse; and outputting said second vibration control pulse to said vibration element to provide tactile feedback wherein said first intensity parameter is different from said second intensity parameter.

15. The method of claim 14 wherein said vibration element forms a part of a touch screen.

16. The method of claim 14 wherein said vibration element forms a part of a mobile phone.

17. The method of claim 14 wherein said first and second intensity parameters are defined in an application program interface.

18. The method of claim 14 wherein said vibration element comprises a haptic actuator.

19. A non-transitory medium with a program of machine-readable instructions configured to be executed by a digital data processor, to perform actions comprising:

defining a plurality of parameters for a vibration control pulse comprising a start pulse and a stop pulse, wherein said plurality of parameters comprises at least an intensity parameter, said intensity parameter being a factor that is configured to be used to compute shape of said vibration control pulse and to control at least strength of said vibration control pulse;

using said intensity parameter together with a vibration nominal voltage to compute voltage of said vibration control pulse between said start pulse and said stop pulse;

using said intensity parameter to compute duration of said start pulse and said stop pulse; and outputting said vibration control pulse to a vibration element to provide tactile feedback.

20. The medium of claim 19 wherein said vibration element forms a part of a touch screen.

21. The medium of claim 19 wherein said vibration element forms a part of a battery powered mobile device.

22. An integrated circuit comprising:

first circuitry configured to define a plurality of parameters for a vibration control pulse comprising a start pulse and a stop pulse, wherein said plurality of parameters comprises at least an intensity parameter, said intensity parameter being a factor that is configured to be used to compute shape of said vibration control pulse and to control at least strength of said vibration control pulse;

the first circuitry being configured to use said intensity parameter together with a vibration nominal voltage to compute voltage of said vibration control pulse between said start pulse and said stop pulse;

the first circuitry being configured to use said intensity parameter to compute duration of said start pulse and said stop pulse; and second circuitry configured to output said vibration control pulse to a vibration element of a touch screen to provide tactile feedback.

23. An integrated circuit comprising:

first circuitry configured to define a plurality of parameters for a vibration control pulse comprising a start pulse and a stop pulse, wherein said plurality of parameters comprises at least an intensity parameter, said intensity parameter being a factor that is configured to be used to compute shape of said vibration control pulse and to control at least strength of said vibration control pulse;

the first circuitry being configured to use said intensity parameter together with a vibration nominal voltage to compute voltage of said vibration control pulse between said start pulse and said stop pulse;

the first circuitry being configured to use said intensity parameter to compute duration of said start pulse and said stop pulse; and second circuitry configured to output said vibration control pulse to a vibra module.

* * * * *